United States Patent
Choi et al.

(10) Patent No.: US 10,282,587 B2
(45) Date of Patent: May 7, 2019

(54) SENSING MODULE SUBSTRATE AND SENSING MODULE INCLUDING THE SAME

(71) Applicant: SAMSUNG ELECTRONICS CO., LTD., Suwon-si (KR)

(72) Inventors: Inho Choi, Seoul (KR); Youngdoo Jung, Suwon-si (KR); Woonbae Kim, Seoul (KR); Jungwoo Kim, Osan-si (KR); Ji-Yong Park, Hwaseong-si (KR); Kyoungsuk Yang, Hwaseong-si (KR); Jeong-Kyu Ha, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 15/395,623

(22) Filed: Dec. 30, 2016

(65) Prior Publication Data
US 2017/0235997 A1    Aug. 17, 2017

(30) Foreign Application Priority Data

Feb. 12, 2016 (KR) .......................... 10-2016-0016543

(51) Int. Cl.
*G06K 9/20* (2006.01)
*G06K 9/00* (2006.01)

(52) U.S. Cl.
CPC ..... *G06K 9/00087* (2013.01); *G06K 9/00013* (2013.01)

(58) Field of Classification Search
CPC .................. G06K 9/00013–2009/0006
See application file for complete search history.

(56) References Cited

U.S. PATENT DOCUMENTS

| | | | |
|---|---|---|---|
| 7,015,579 B2 | 3/2006 | Okada et al. | |
| 7,042,104 B2 | 5/2006 | Hong | |
| 8,872,337 B2 | 10/2014 | Kim et al. | |
| 9,001,081 B2 | 4/2015 | Pope et al. | |
| 9,024,887 B2 | 5/2015 | Lee | |
| 9,030,440 B2 | 5/2015 | Pope et al. | |
| 9,157,805 B2 | 10/2015 | Yamazaki et al. | |
| 9,332,649 B2 | 5/2016 | Kim et al. | |
| 2004/0188838 A1* | 9/2004 | Okada ................. | G06K 9/0002 257/738 |
| 2005/0035467 A1 | 2/2005 | Hong | |
| 2008/0087995 A1 | 4/2008 | Yang et al. | |
| 2008/0308924 A1* | 12/2008 | Szewerenko ....... | H01L 23/3128 257/696 |

(Continued)

FOREIGN PATENT DOCUMENTS

| | | | |
|---|---|---|---|
| JP | 2013-222735 A | 10/2013 | |
| KR | 10-2005-0019233 A | 3/2005 | |

(Continued)

*Primary Examiner* — Brian Werner
(74) *Attorney, Agent, or Firm* — Sughrue Mion, PLLC

(57) ABSTRACT

A sensing module substrate and a sensing module including the same are provided. The sensing module substrate includes a film substrate having a first surface and a second surface; sensing vias which penetrate the film substrate from the first surface to the second surface, each of the sensing vias being configured to be coupled to pixels of a semiconductor chip; and an interconnection pattern provided on at least one of the first surface and the second surface of the film substrate.

20 Claims, 22 Drawing Sheets

(56) References Cited

U.S. PATENT DOCUMENTS

| | | | |
|---|---|---|---|
| 2009/0039449 A1* | 2/2009 | Chou | G06K 9/00053 |
| | | | 257/415 |
| 2011/0215480 A1* | 9/2011 | Gorczyca | H01L 23/4985 |
| | | | 257/774 |
| 2011/0242023 A1 | 10/2011 | Lee | |
| 2013/0306868 A1 | 11/2013 | Yamazaki et al. | |
| 2013/0307818 A1 | 11/2013 | Pope et al. | |
| 2014/0131889 A1 | 5/2014 | Kim et al. | |
| 2014/0167245 A1 | 6/2014 | Kim et al. | |
| 2014/0216914 A1 | 8/2014 | Pope et al. | |
| 2015/0269911 A1 | 9/2015 | Choi et al. | |
| 2015/0371976 A1* | 12/2015 | Chang | H05K 1/189 |
| | | | 257/89 |
| 2016/0104024 A1* | 4/2016 | Slogedal | G06K 9/0002 |
| | | | 324/649 |
| 2017/0193273 A1* | 7/2017 | Lee | G06K 9/0002 |
| 2017/0217825 A1* | 8/2017 | Hasegawa | C03C 17/32 |
| 2017/0243798 A1* | 8/2017 | Park | H01L 24/32 |

FOREIGN PATENT DOCUMENTS

| | | |
|---|---|---|
| KR | 10-0546364 B1 | 1/2006 |
| KR | 10-2006-0074089 A | 7/2006 |
| KR | 10-0813623 B1 | 3/2008 |
| KR | 10-2008-0059836 A | 7/2008 |
| KR | 10-0946074 B1 | 3/2010 |
| KR | 10-2011-0109336 A | 10/2011 |
| KR | 10-2014-0062607 A | 5/2014 |
| KR | 10-2015-0078983 A | 7/2015 |
| KR | 10-2015-0108986 A | 10/2015 |

\* cited by examiner

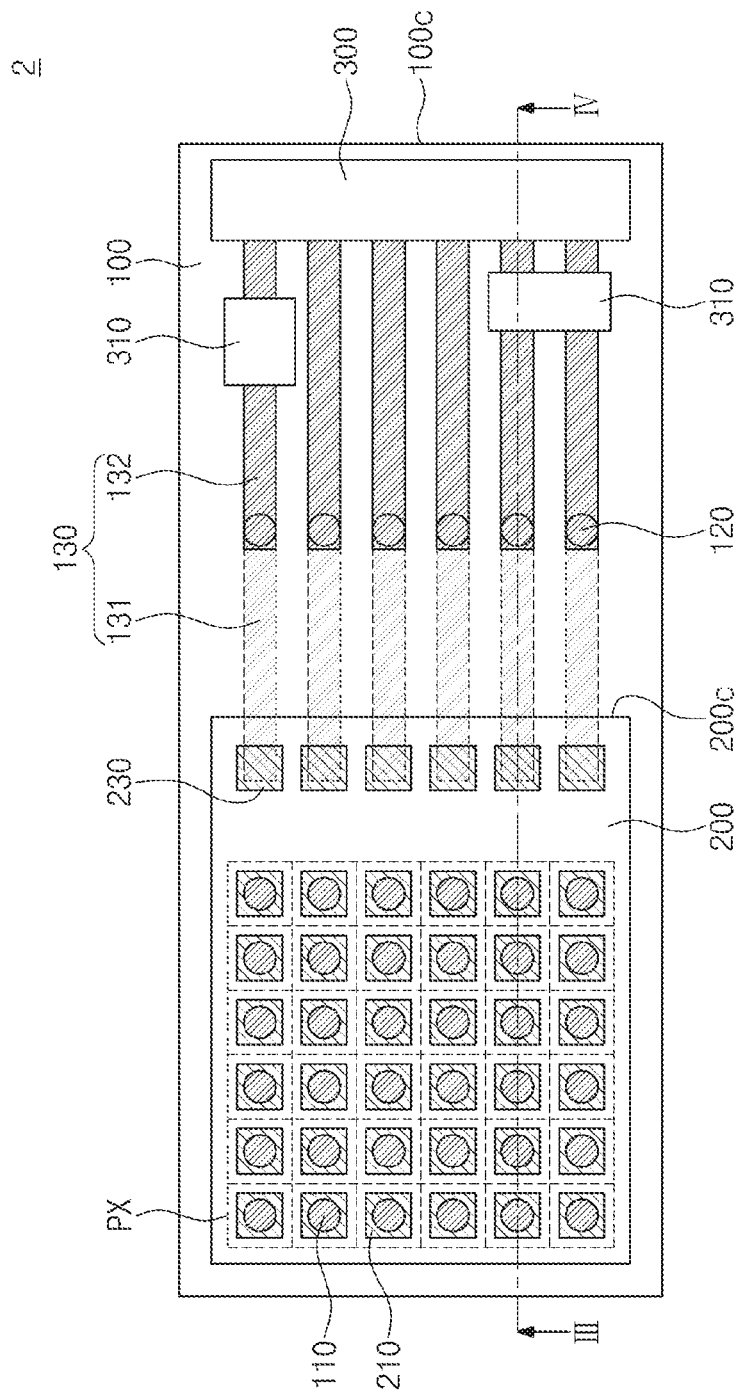

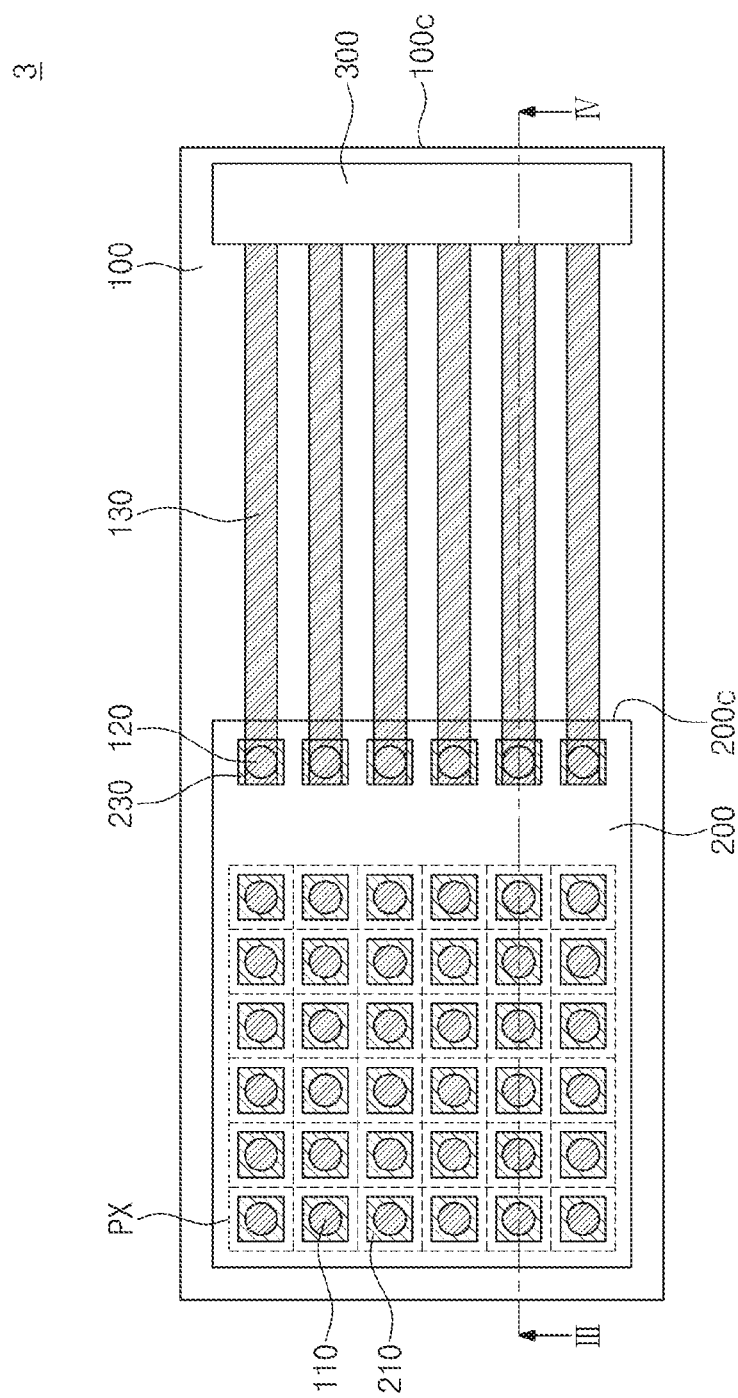

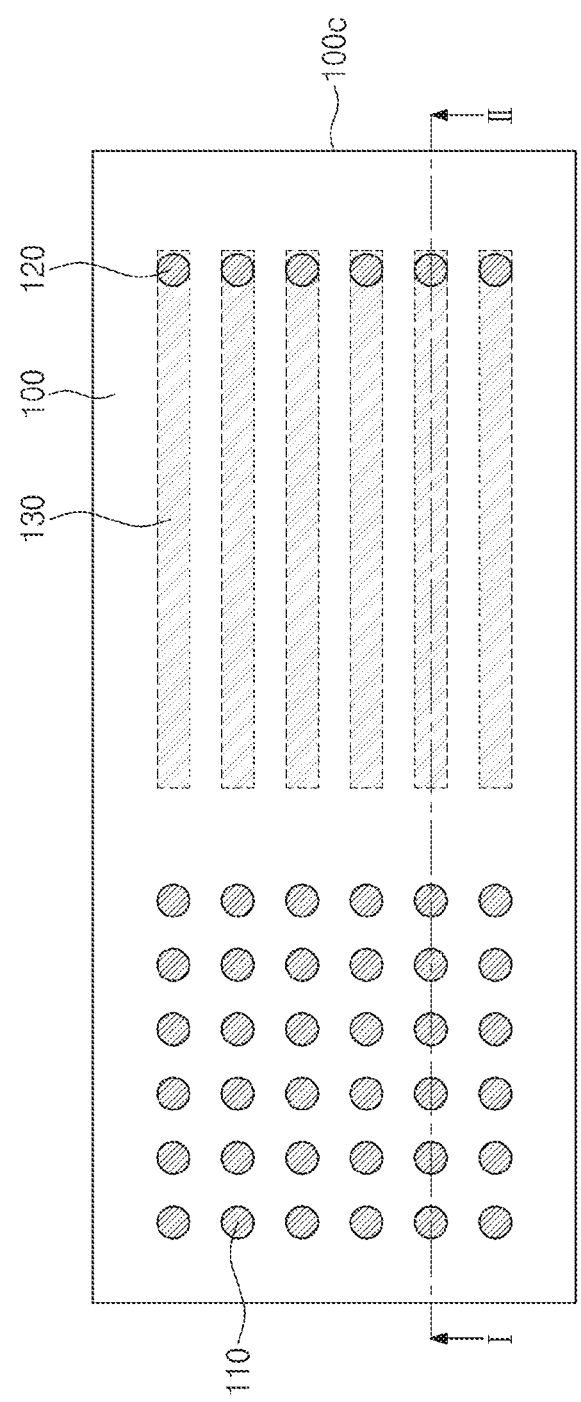

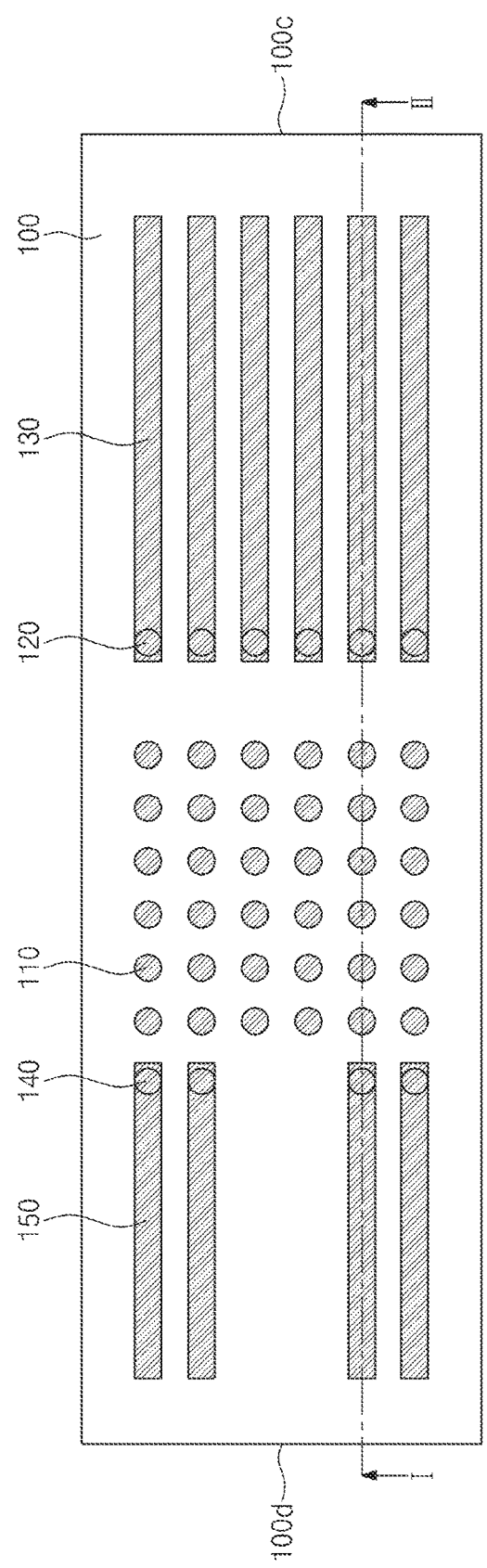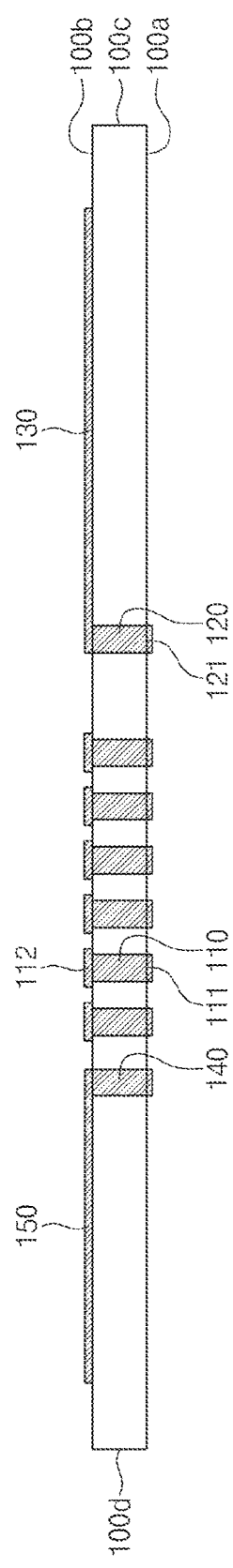

SENSING MODULE SUBSTRATE AND SENSING MODULE INCLUDING THE SAME

CROSS-REFERENCE TO RELATED APPLICATIONS

This application claims priority from Korean Patent Application No. 10-2016-0016543, filed on Feb. 12, 2016 in the Korean Intellectual Property Office, the entire contents of which are hereby incorporated by reference.

BACKGROUND

The present disclosure relates to a sensing module, and in particular, to a sensing module substrate and a sensing module including the same.

A fingerprint recognition sensor is configured to recognize a fingerprint of a user and is widely used in door-lock systems as well as mobile products (e.g., a laptop computer and a mobile phone). The fingerprint recognition sensor may be classified into ultrasonic wave, infrared light, and electrostatic capacitance types, depending on its operation principle. Many studies are being conducted to improve reliability and sensitivity of the fingerprint recognition sensor.

SUMMARY

One or more example embodiments provide a highly-reliable and highly-sensitive sensing module and a film substrate therefor.

One or more example embodiments also provide a small-sized sensing module and a film substrate therefor.

According to an aspect of an example embodiment, there is provided a sensing module substrate including: a film substrate having a first surface and a second surface; sensing vias which penetrate the film substrate from the first surface to the second surface, each of the sensing vias being configured to be coupled to pixels of a semiconductor chip; and an interconnection pattern provided on at least one of the first surface and the second surface of the film substrate.

According to an aspect of an example embodiment, there is provided a sensing module including: a film substrate having a first surface and a second surface; sensing vias which penetrate the film substrate from the first surface to the second surface; and a semiconductor chip provided at the first surface of the film substrate and coupled to the sensing vias, the semiconductor chip comprising pixels provided at a surface of the semiconductor chip at positions corresponding to the sensing vias.

According to an aspect of an example embodiment, there is provided a sensing module including: a film substrate having a first surface and a second surface; sensing vias which penetrate the film substrate from the first surface to the second surface; a semiconductor chip provided at the first surface of the film substrate and coupled to the sensing vias, the semiconductor chip comprising pixels provided at a surface of the semiconductor chip at positions corresponding to the sensing vias; a glass layer provided on the second surface of the film substrate and over the sensing vias; and a bezel partially covering at least one of a top surface and a side surface of the glass layer.

BRIEF DESCRIPTION OF THE DRAWINGS

The above and/or other aspects will be more clearly understood from the following detailed description of example embodiments taken in conjunction with the accompanying drawing, in which:

FIG. 4A is a plan view illustrating a sensing module according to an example embodiment;
FIG. 6A is a plan view illustrating a sensing module according to an example embodiment;
FIG. 7A is a plan view illustrating a film substrate according to an example embodiment;
FIG. 9A is a plan view illustrating a film substrate according to an example embodiment;
FIG. 9B is a section taken along line I-II of FIG. 9A.

DETAILED DESCRIPTION

Example embodiments will now be described more fully hereinafter with reference to the accompanying drawings.

Figure 1A:
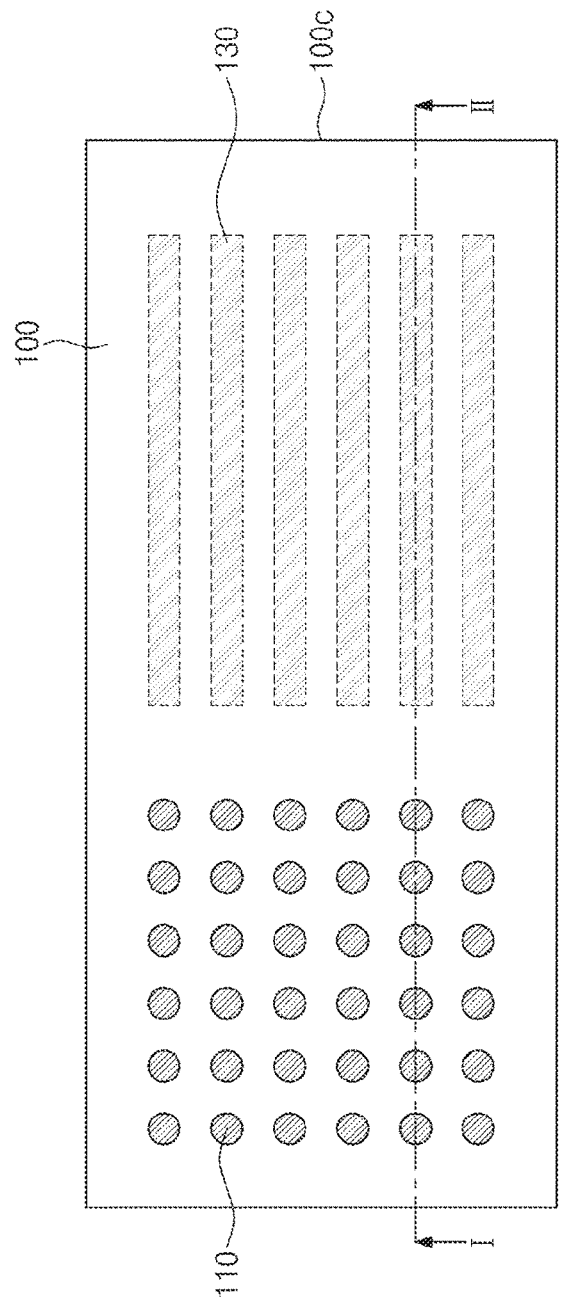
FIG. 1A is a plan view illustrating a film substrate according to an example embodiment.
Figure 1B:
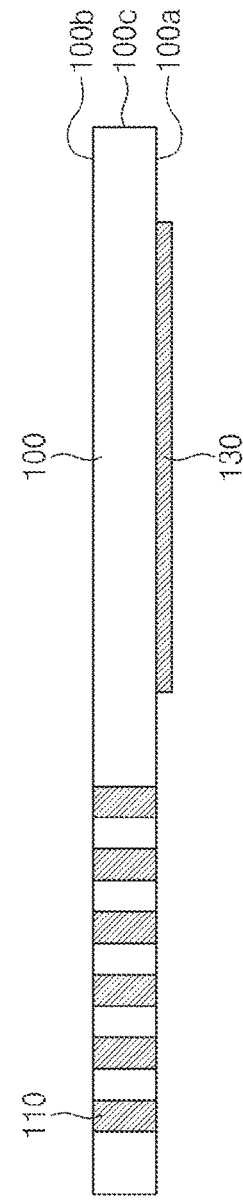
FIG. 1B is a section taken along line I-II of FIG. 1A.

FIG. 1A is a plan view illustrating a film substrate according to an example embodiment, and FIG. 1B is a section taken along line I-II of FIG. 1A.

Referring to FIGS. 1A and 1B, a film substrate 100 may include sensing vias 110 and an interconnection pattern 130 including at least one interconnection element. The film substrate 100 may have a first surface 100a and a second surface 100b opposite to the first surface 100a. The film substrate 100 may also have a first side 100c connecting the first and second surfaces 100a and 100b. The film substrate 100 may be formed of or include at least one of polymeric materials (e.g., polyimide or polyester). The film substrate 100 may be flexible.

The sensing vias 110 may be arranged in an array or matrix, as shown in FIG. 1A. For example, the sensing vias 110 may be two-dimensionally arranged in a plurality of rows and a plurality of columns. The columns may be parallel to the first side 100c of the film substrate 100 and may cross the rows. The arrangement of the sensing vias 110 and a planar shape of the array of the sensing vias 110 may be variously changed. The sensing vias 110 may be formed of or include at least one of conductive materials (e.g., gold (Au), copper (Cu), aluminum (Al), tin (Sn), or alloys thereof). As shown in FIG. 1B, the sensing vias 110 may penetrate the film substrate 100 from the first surface 100a to the second surface 100b.

The interconnection pattern 130 may be disposed on the first surface 100a of the film substrate 100. When viewed in a plan view, as shown in FIG. 1A, the interconnection pattern 130 may be spaced apart from the sensing vias 110 and may be electrically disconnected from the sensing vias 110. The interconnection pattern 130 may be provided between the sensing vias 110 and the first side 100c of the film substrate 100. The interconnection pattern 130 may extend in a direction crossing the first side 100c of the film substrate 100, e.g., in a longitudinal direction of the film substrate 1000. The interconnection pattern 130 may include two opposite end portions, which are positioned adjacent to the sensing vias 110 and the first side 100c, respectively. The interconnection pattern 130 may be formed of or include at least one of conductive materials (e.g., copper (Cu) or aluminum (Al)).

Figure 2A:
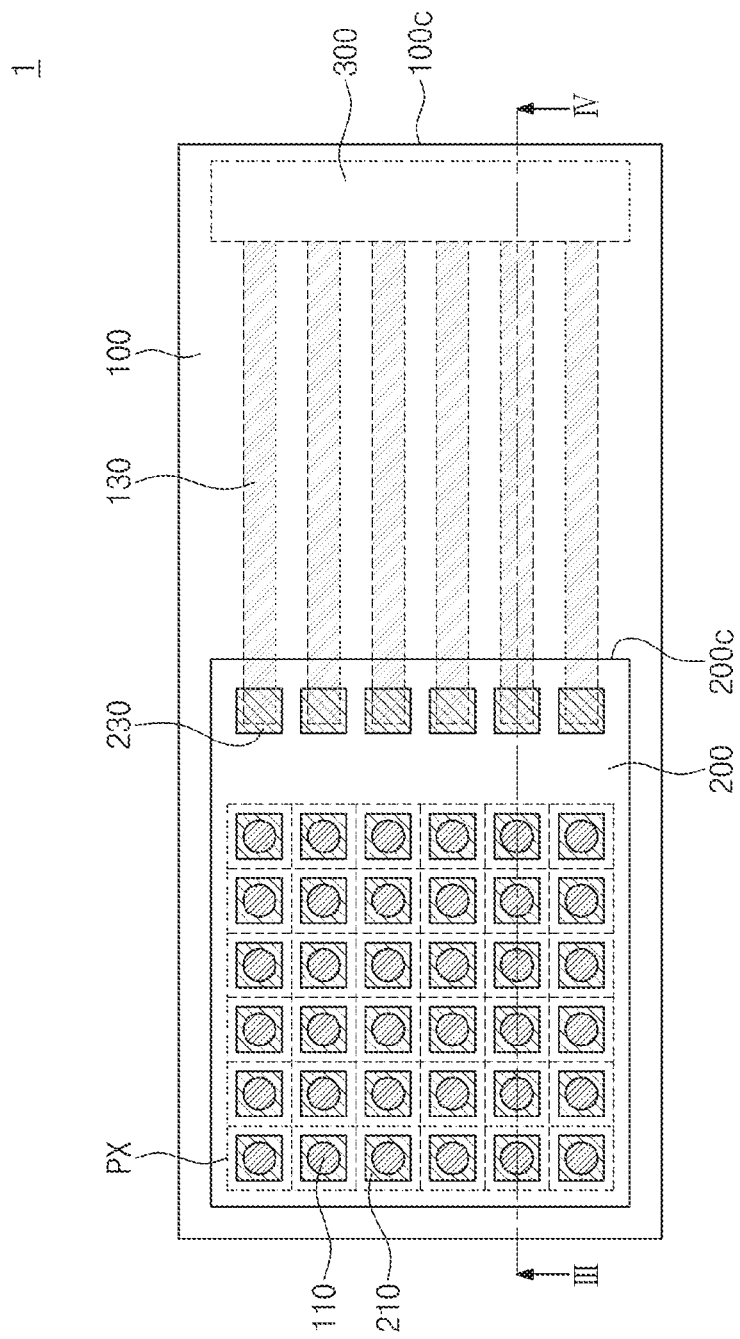
FIG. 2A is a plan view illustrating a sensing module according to an example embodiment.
Figure 2B:
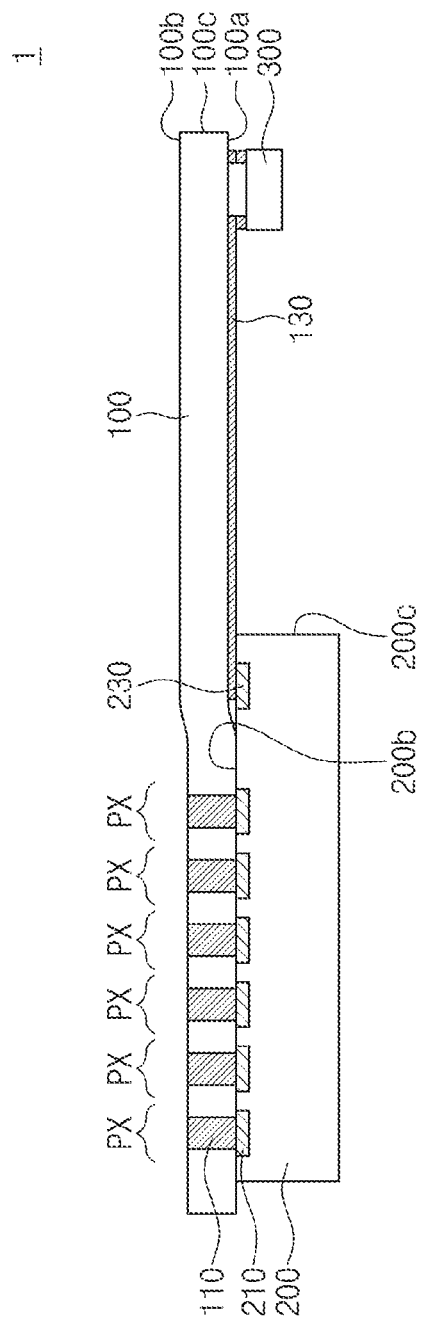
FIG. 2B is a section taken along line III-IV of FIG. 2A.

FIG. 2A is a plan view illustrating a sensing module according to an example embodiment. FIG. 2B is a section taken along line III-IV of FIG. 2A. For concise description, a previously described element may be identified by a similar or identical reference number without repeating an overlapping description thereof.

Referring to FIGS. 2A and 2B, a sensing module 1 may include the film substrate 100, a semiconductor chip 200, and a connector 300. The film substrate 100 may be configured to have the same features as that described with reference to FIGS. 1A and 1B. For example, the film substrate 100 may include the sensing vias 110 and the interconnection pattern 130. The film substrate 100 may be formed of or include a flexible material.

The semiconductor chip 200 may be provided on the first surface 100a of the film substrate 100. The semiconductor chip 200 may be provided in such a way that a top surface 200b thereof faces the first surface 100a of the film substrate 100. The semiconductor chip 200 may include a plurality of pixels PX that are provided on the top surface 200b. As shown in FIG. 2A, the plurality of pixels PX may be arranged in a two-dimensional array or matrix. As an example, the pixels PX may be two-dimensionally arranged in one or more rows and one or more columns. The columns may be parallel to the first side 100c of the film substrate 100 and may cross the rows. However, the arrangement of the pixels PX and a planar shape of the array of the pixels PX may be variously changed. The pixels PX of the semiconductor chip 200 may serve as an identity recognizing region for recognizing a user identity. For example, the pixels PX may be exposed to a touch event of a user, and the semiconductor chip 200 may be configured to execute a function for recognizing information on fingerprint of a user.

Sensing plates 210 may be provided vertically in the semiconductor chip 200 and horizontally in the pixels PX. A planar arrangement of the sensing plates 210 may correspond to that of the pixels PX of the semiconductor chip 200. The sensing plates 210 may be adjacent to the top surface 200b of the semiconductor chip 200. The sensing plates 210 may be used to measure electric capacitances of the pixels PX. Although each of the sensing plates 210 is illustrated to have a rectangular or square planar shape, a planar shape of each of the sensing plates 210 may be circular, elliptical, or polygonal. A circuit pattern including integrated circuits may be provided in the semiconductor chip 200 to be adjacent to the top surface 200b. The integrated circuits in the semiconductor chip 200 may be used to convert a change in capacitance, which are measured by the sensing plates 210 of the pixels PX, into an electrical signal.

The sensing vias 110 may penetrate the film substrate 100. The sensing vias 110 may be provided on the pixels PX, respectively, of the semiconductor chip 200. When viewed in a plan view, the sensing vias 110 may overlap with the pixels PX, as shown in FIG. 2A. The number of the sensing vias 110 may be the same as that of the pixels PX of the semiconductor chip 200. A planar arrangement of the sensing vias 110 may correspond to that of the pixels PX of the semiconductor chip 200. The sensing vias 110 may be arranged in an array. The sensing vias 110 may be electrically connected to the sensing plates 210, respectively. In the present specification, the expression "electrically connected or coupled" may mean of a direct coupling or an indirect coupling using another conductive element. The sensing vias 110 may be formed of or include at least one of conductive materials (e.g., copper (Cu), aluminum (Al), tin (Sn), gold (Au), or alloys thereof). User's touch event may occur on the second surface 100b of the film substrate 100, which is positioned on the pixels PX of the semiconductor chip 200. The smaller a distance between the sensing plates 210 and the touch event, the higher the sensitivity and accuracy in a sensing operation of the semiconductor chip 200. The sensing vias 110 may be configured to allow information on the touch event to be transmitted to the sensing plates 210 of the semiconductor chip 200. In some embodiments, a distance between the sensing vias 110 and the touch event may be smaller than a distance between the sensing plates 210 and the touch event. Accordingly, it is possible to improve sensitivity and accuracy in a sensing operation of the semiconductor chip 200.

A connection pad 230 may be provided on the top surface 200b of the semiconductor chip 200. The connection pad 230 may be laterally spaced apart from each other the array of the sensing plates 210. The connection pad 230, as compared with the sensing plates 210, may be closer to a side 200c of the semiconductor chip 200. The side 200c may be a side of the semiconductor chip 200 that is most adjacent (closest) to the first side 100c of the film substrate 100. The connection pad 230 may be electrically connected to an integrated circuit of the semiconductor chip 200. The connection pad 230 may be formed of or include at least one of conductive materials (e.g., copper (Cu), aluminum (Al), tin (Sn), gold (Au), or alloys thereof).

The interconnection pattern 130 may be provided on the first surface 100a of the film substrate 100. The interconnection pattern 130 may include an end portion, which is provided on and coupled to the connection pad 230.

The connector 300 may be provided on the first surface 100a of the film substrate 100. The connector 300 may be closer to the first side 100c of the film substrate 100 than to the semiconductor chip 200. The connector 300 may be coupled to an opposite end portion of the interconnection pattern 130. Electrical signals output from the semiconductor chip 200 may be transmitted to the connector 300 through the connection pad 230 and the interconnection pattern 130. In some embodiments, since the connector 300 and the semiconductor chip 200 are provided on the film substrate 100, it is possible to omit an additional package substrate (e.g., a printed circuit board (PCB)). Furthermore, since the semiconductor chip 200 is electrically connected to the connector 300 via the interconnection pattern 130, an additional bonding wire may be omitted. This may make it possible to reduce a size of the sensing module 1.

Figure 3A:
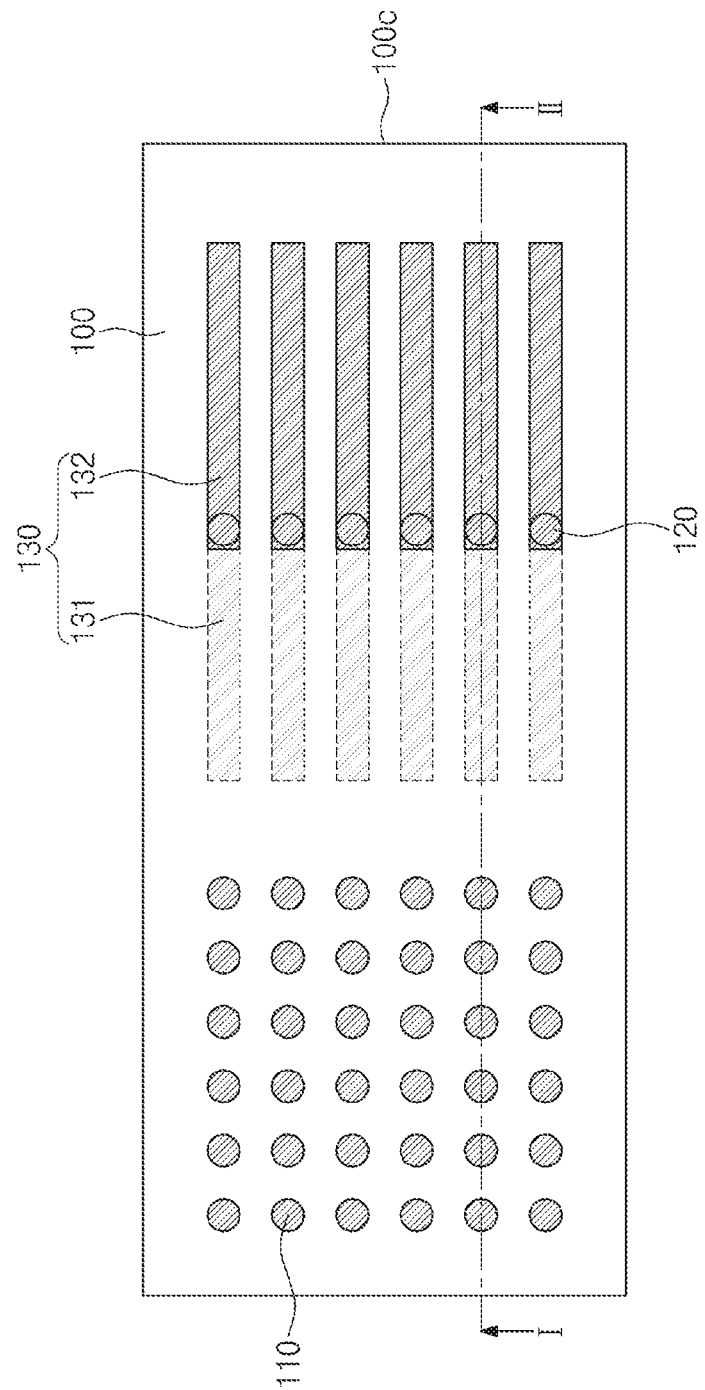
FIG. 3A is a plan view illustrating a film substrate according to an example embodiment.
Figure 3B:
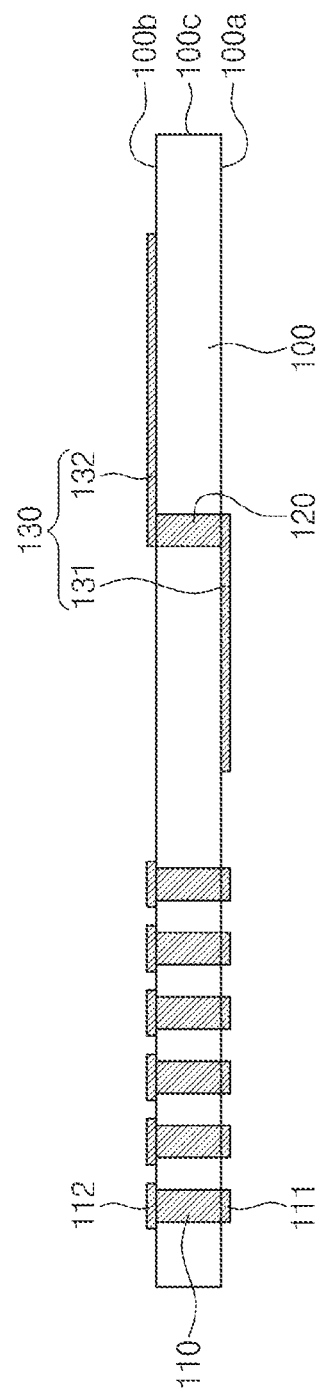
FIG. 3B is a section taken along line I-II of FIG. 3A.

FIG. 3A is a plan view illustrating a film substrate according to an example embodiment. FIG. 3B is a section taken along line I-II of FIG. 3A. For concise description, a previously described element may be identified by a similar or identical reference number without repeating an overlapping description thereof.

Referring to FIGS. 3A and 3B, the film substrate 100 may include the sensing vias 110 and the interconnection pattern 130. The film substrate 100 may be flexible. The film substrate 100 may be formed of or include at least one of insulating materials (e.g., polymeric materials).

The sensing vias 110 may penetrate the first and second surfaces 100a and 100b of the film substrate 100. The sensing vias 110 may be arranged in an array. Upper pads 112 may be provided on the second surface 100b of the film substrate 100 and may be connected to the sensing vias 110, respectively. The upper pads 112 may have a mean width that is larger than that of the sensing vias 110. A planar arrangement of the upper pads 112 may correspond to that of the sensing vias 110. The number of the upper pads 112 may be the same as that of the sensing vias 110. Lower pads 111 may be provided on the first surface 100a of the film substrate 100 and may be coupled to the sensing vias 110, respectively. The lower pads 111 may have a mean width that is the same as or larger than that of the sensing vias 110. The width of each of the lower pads 111 may be smaller than that of each of the upper pads 112. The number of the lower pads 111 may be the same as that of the sensing vias 110. The upper pads 112 and the lower pads 111 may be formed of or include at least one of conductive materials (e.g., copper (Cu), aluminum (Al), tin (Sn), gold (Au), or alloys thereof). As another example, the upper pads 112 or the lower pads 111 may be omitted.

A connection via 120 may penetrate the first and second surfaces 100a and 100b of the film substrate 100. The connection via 120 may be located between the sensing vias 110 and the first side 100c of the film substrate 100. The connection via 120 may be spaced apart from the array of the sensing vias 110 and may be electrically disconnected from the sensing vias 110. The connection via 120 may be formed of or include at least one of conductive materials (e.g., copper (Cu), aluminum (Al), tin (Sn), gold (Au), or alloys thereof).

The interconnection pattern 130 may include a first interconnection pattern 131 and a second interconnection pattern 132. The first interconnection pattern 131 may be provided on the first surface 100a of the film substrate 100. As shown in FIG. 3A, when viewed in a plan view, the first interconnection pattern 131 may be disposed between the sensing vias 110 and the connection via 120. The first interconnection pattern 131 may be coupled to the connection via 120. The second interconnection pattern 132 may be provided on the second surface 100b of the film substrate 100. The first side 100c of the film substrate 100 may be closer to the second interconnection pattern 132 than to the first interconnection pattern 131. An end portion of the second interconnection pattern 132 may be coupled to the connection via 120. An opposite end portion of the second interconnection pattern 132 may face the first side 100c of the film substrate 100. The first and second interconnection patterns 131 and 132 may be electrically disconnected from the sensing vias 110. The first and second interconnection patterns 131 and 132 may be formed of or include at least one of conductive materials (e.g., copper (Cu) or aluminum (Al)).

Figure 4B:
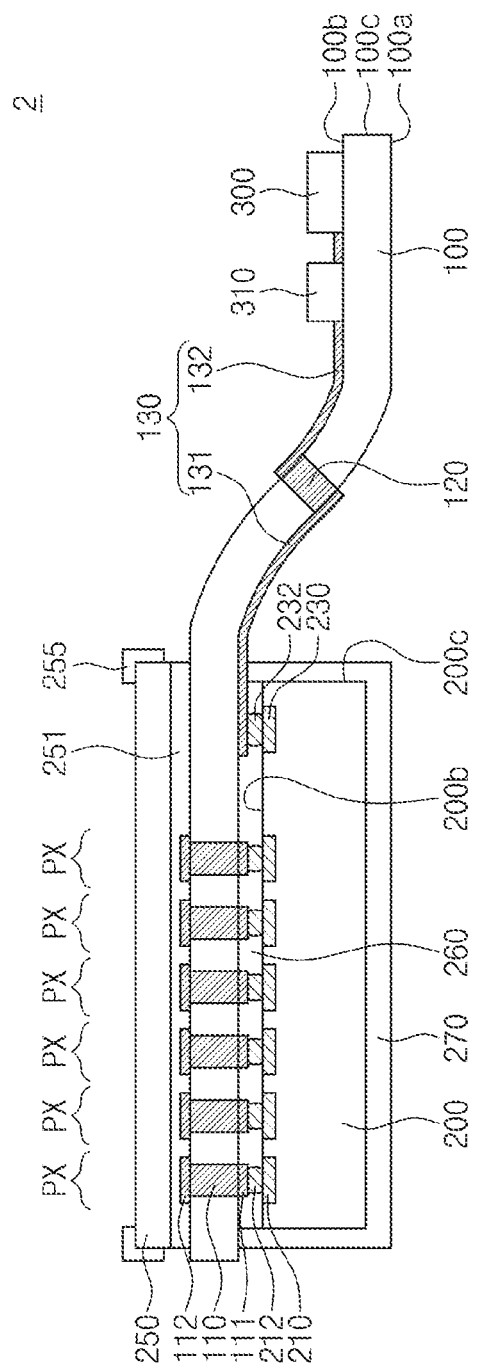
FIG. 4B is a section taken along line III-IV of FIG. 4A.

FIG. 4A is a plan view illustrating a sensing module according to an example embodiment. FIG. 4B is a section taken along line III-IV of FIG. 4A. For concise description, a previously described element may be identified by a similar or identical reference number without repeating an overlapping description thereof.

Referring to FIGS. 4A and 4B, a sensing module 2 may include the film substrate 100, the semiconductor chip 200, and the connector 300. The film substrate 100 may be configured to have the same features as that described with reference to FIGS. 3A and 3B. The film substrate 100 may include the sensing vias 110, the first interconnection pattern 131, the second interconnection pattern 132, and the connection via 120. The film substrate 100 may be formed of or include a flexible material.

The semiconductor chip 200 may be provided on the first surface 100a of the film substrate 100. The semiconductor chip 200 may be configured to have the same features as that described with reference to FIGS. 2A and 2B. For example, the semiconductor chip 200 may include the pixels PX provided on the top surface thereof. As shown in FIG. 4A, the pixels PX may be arranged in a two-dimensional array. The sensing plates 210 may be provided vertically in the semiconductor chip 200 and horizontally in the pixels PX. The sensing vias 110 may penetrate the film substrate 100 and may be provided on the pixels PX, respectively, of the semiconductor chip 200. The lower and upper pads 111 and 112 may be respectively provided on the first and second surfaces 100a and 100b of the film substrate 100 and at positions corresponding to the pixels PX of the semiconductor chip 200. Sensing interposers 212 may be interposed between the film substrate 100 and the semiconductor chip 200. Each of the sensing interposers 212 may be coupled between a corresponding one of the sensing plates 210 and a corresponding one of the lower pads 111. The sensing interposers 212 may be formed of or include at least one of conductive materials (e.g., gold (Au), copper (Cu), aluminum (Al), tin (Sn), or alloys thereof). Each of the sensing interposers 212 may be provided in the form of a bump or a solder.

An insulating pattern 260 may be provided between the semiconductor chip 200 and the film substrate 100 to cover side surfaces of the sensing interposers 212 and a side surface of a connection interposer 232. The insulating pattern 260 may be formed of or include at least one of polymeric materials (e.g., epoxy- or polyimide-based materials). A mold layer 270 may be disposed on the first surface 100a of the film substrate 100 to cover the semiconductor chip 200. The mold layer 270 may be formed of or include an epoxy molding compound (EMC).

A glass layer 250 may be provided on the second surface 100b of the film substrate 100. The glass layer 250 may be overlapped with the sensing vias 110 and the pixels PX of the semiconductor chip 200, when viewed in a plan view. A touch event may occur on a top surface of the glass layer 250. Information on the touch event may be transmitted to the sensing plates 210 through the upper pads 112, the sensing vias 110, the lower pads 111, and the sensing interposers 212. In some embodiments, a distance between the touch event and the upper pads 112 may be shorter than that between the touch event and the sensing plates 210. Accordingly, it is possible to further improve sensitivity and accuracy in a sensing operation of the semiconductor chip 200.

An adhesive layer 251 may be interposed between the film substrate 100 and the glass layer 250. The glass layer 250 may be attached to the second surface 100b of the film substrate 100 by the adhesive layer 251. The adhesive layer 251 may be formed of or include a polymer material (e.g., polyimide) or an under-fill material. In certain embodiments, a color filter layer may be further provided between the adhesive layer 251 and the film substrate 100 or between the adhesive layer 251 and the glass layer 250.

A bezel 255 may be provided on top and side surfaces and/or an edge portion of the glass layer 250. Here, the edge portion of the glass layer 250 may be a portion at which the top and side surfaces of the glass layer 250 meet each other. In some embodiments, the glass layer 250 may be inserted in the bezel 255. The bezel 255 may include a stainless steel material.

The connection pad 230 may be provided on the top surface 200b of the semiconductor chip 200. The connection pad 230 may be disposed to be closer to the side 200c of the semiconductor chip 200 than to the sensing plates 210. The connection interposer 232 may be provided on and coupled to the connection pad 230. The connection interposer 232 may be formed of or include at least one of the afore-described conductive materials for the sensing interposers 212.

The first interconnection pattern 131 may be provided on the first surface 100a of the film substrate 100. An end portion of the first interconnection pattern 131 may be coupled to the connection pad 230. The connection via 120 may penetrate the film substrate 100 and may be coupled to an opposite end portion of the first interconnection pattern 131. The second interconnection pattern 132 may be provided on the second surface 100b of the film substrate 100. An end portion of the second interconnection pattern 132 may be coupled to the connection via 120.

A device 310 may be disposed on the second surface 100b of the film substrate 100. As an example, the device 310 may include a passive device (e.g., a capacitor, a resistor, or an inductor). As another example, the device 310 may include an active device (e.g., a memory chip or a logic chip). The second interconnection pattern 132 may be electrically connected to the device 310. The disposition and number of the device 310 may be variously changed from that illustrated in the drawings.

The connector 300 may be provided adjacent to the first side 100c of the film substrate 100, on the first surface 100a of the film substrate 100. The connector 300 may be coupled to the second interconnection pattern 132. The second interconnection pattern 132 may also be disposed between the device 310 and the connector 300. The connector 300 may be electrically connected to the connection pad 230 through the second interconnection pattern 132, the connection via 120, and the first interconnection pattern 131.

Figure 5A:
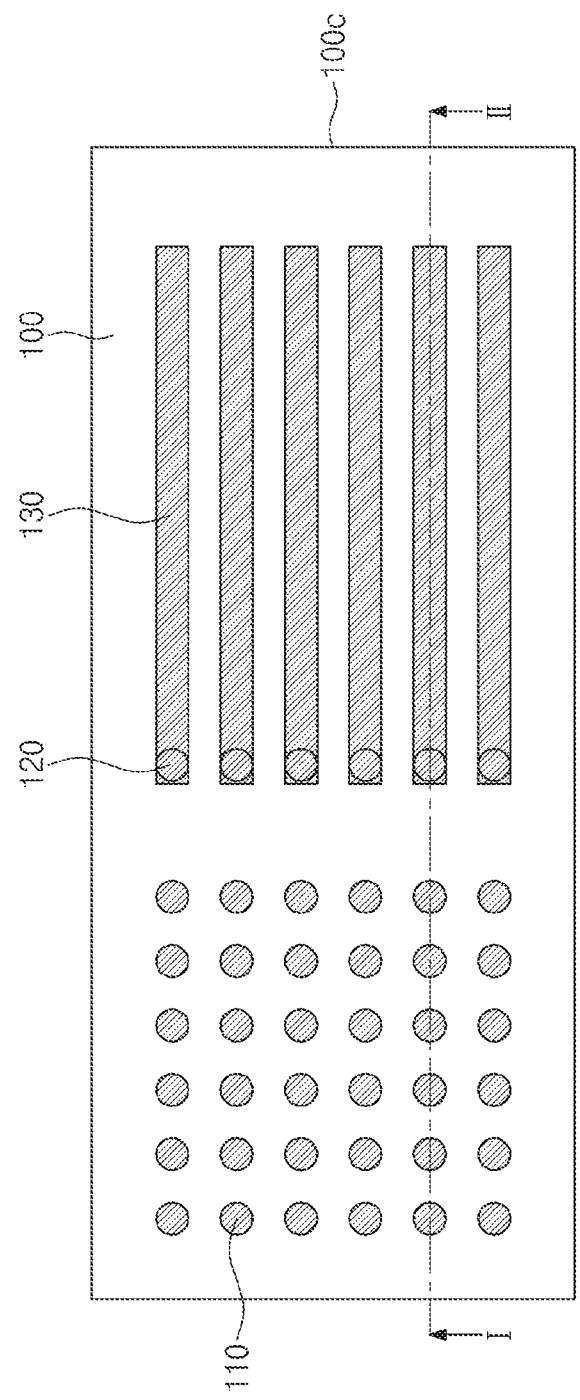
FIG. 5A is a plan view illustrating a film substrate according to an example embodiment.
Figure 5B:
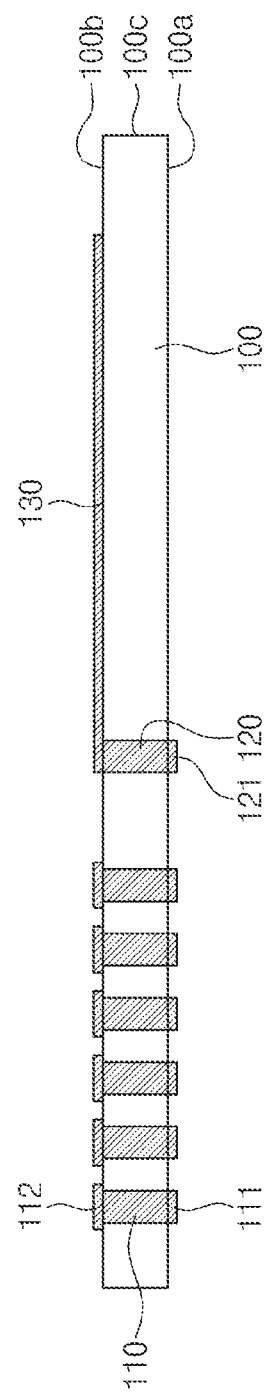
FIG. 5B is a section taken along line I-II of FIG. 5A.

FIG. 5A is a plan view illustrating a film substrate according to an example embodiment. FIG. 5B is a section taken along line I-II of FIG. 5A. For concise description, a previously described element may be identified by a similar or identical reference number without repeating an overlapping description thereof.

Referring to FIGS. 5A and 5B, the film substrate 100 may include the sensing vias 110 and the interconnection pattern 130. The sensing vias 110, the lower pads 111, and the upper pads 112 may be configured to have the same features as those described with reference to FIGS. 3A and 3B.

The connection via 120 may penetrate the film substrate 100. The connection via 120 may be provided between the sensing vias 110 and the first side 100c of the film substrate 100. The interconnection pattern 130 may be provided on the second surface 100b of the film substrate 100. An end portion of the interconnection pattern 130 may be coupled to the connection via 120. An opposite end portion of the interconnection pattern 130 may be positioned to face the first side 100c of the film substrate 100. An interconnection pad 121 may be disposed on the first surface 100a of the film substrate 100. The interconnection pad 121 may be provided on a bottom surface of the connection via 120 and may be coupled to the connection via 120. The interconnection pad 121 may be formed of or include at least one of copper (Cu), aluminum (Al), tin (Sn), gold (Au), or alloys thereof. In certain embodiments, the interconnection pad 121 may be omitted.

Figure 6B:
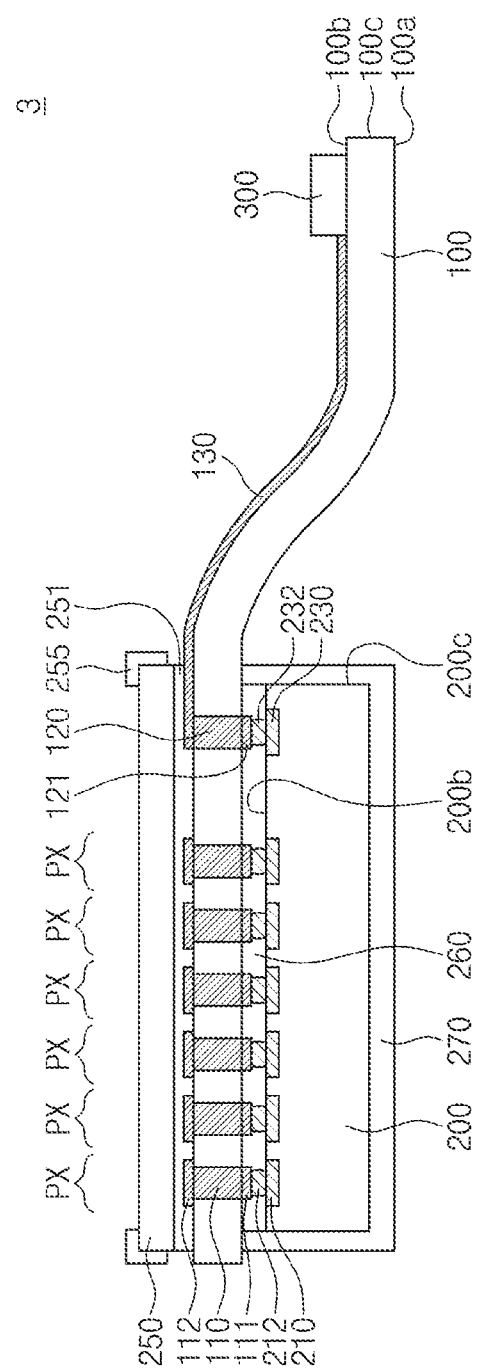
FIG. 6B is a section taken along line III-IV of FIG. 6A.

FIG. 6A is a plan view illustrating a sensing module according to an example embodiment. FIG. 6B is a section taken along line III-IV of FIG. 6A. For concise description, a previously described element may be identified by a similar or identical reference number without repeating an overlapping description thereof.

Referring to FIGS. 6A and 6B, a sensing module 3 may include the film substrate 100, the semiconductor chip 200, the connector 300, the adhesive layer 251, the glass layer 250, the bezel 255, the insulating pattern 260, and the mold layer 270. The semiconductor chip 200 may be provided on the first surface 100a of the film substrate 100. The film substrate 100 may be configured to have the same features as that described with reference to FIGS. 5A and 5B. The sensing plates 210 may be disposed on the pixels PX, respectively, of the semiconductor chip 200. The sensing interposers 212 may be interposed between the sensing plates 210 and the lower pads 111. The sensing vias 110 may be respectively provided on the pixels PX of the semiconductor chip 200 and may be electrically connected to the sensing plates 210.

The connection pad 230 may be provided on the top surface 200b of the semiconductor chip 200 and may be laterally spaced apart from the sensing plates 210. When viewed in a plan view, as shown in FIG. 6A, the connection via 120 may be overlapped with the connection pad 230. The connection interposer 232 may be interposed between the connection pad 230 and the interconnection pad 121. The connection via 120 may be electrically connected to the connection pad 230 through the interconnection pad 121 and the connection interposer 232. In certain embodiments, the connection interposer 232 or the interconnection pad 121 may be omitted.

The interconnection pattern 130 may be provided on the second surface 100b of the film substrate 100. An end portion of the interconnection pattern 130 may be coupled to the connection via 120.

The connector 300 may be provided on the second surface 100b of the film substrate 100. An opposite end portion of the interconnection pattern 130 may be electrically connected to the connector 300. The device 310 of FIGS. 4A and 4B may be further provided on the second surface 100b of the film substrate 100. In this case, the interconnection pattern 130 may be connected to the device 310.

Figure 7B:
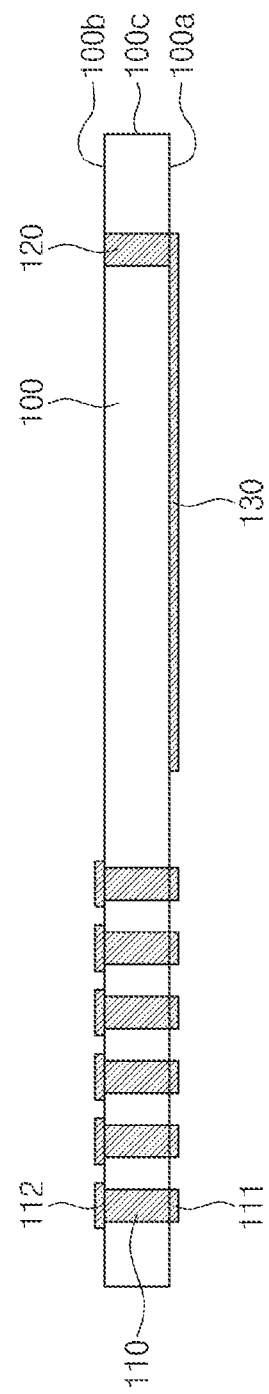
FIG. 7B is a section taken along line I-II of FIG. 7A.

FIG. 7A is a plan view illustrating a film substrate according to an example embodiment. FIG. 7B is a section taken along line I-II of FIG. 7A. For concise description, a previously described element may be identified by a similar or identical reference number without repeating an overlapping description thereof.

Referring to FIGS. 7A and 7B, the film substrate 100 may include the sensing vias 110, the lower pads 111, the upper pads 112, and the interconnection pattern 130. The sensing vias 110, the lower pads 111, and the upper pads 112 may be configured to have the same features as those described with reference to FIGS. 3A and 3B.

The connection via 120 may penetrate the film substrate 100. The connection via 120 may be laterally spaced apart from the sensing vias 110 and may be provided adjacent to the first side 100c of the film substrate 100. The interconnection pattern 130 may be provided on the second surface 100b of the film substrate 100. When viewed in a plan view, as shown in FIG. 7A, the interconnection pattern 130 may be provided between the sensing vias 110 and the first side 100c of the film substrate 100. An end portion of the interconnection pattern 130 may be positioned to face the sensing vias 110. An opposite end portion of the interconnection pattern 130 may be positioned to face the first side 100c of the film substrate 100 and may be coupled to the connection via 120.

Figure 8A:
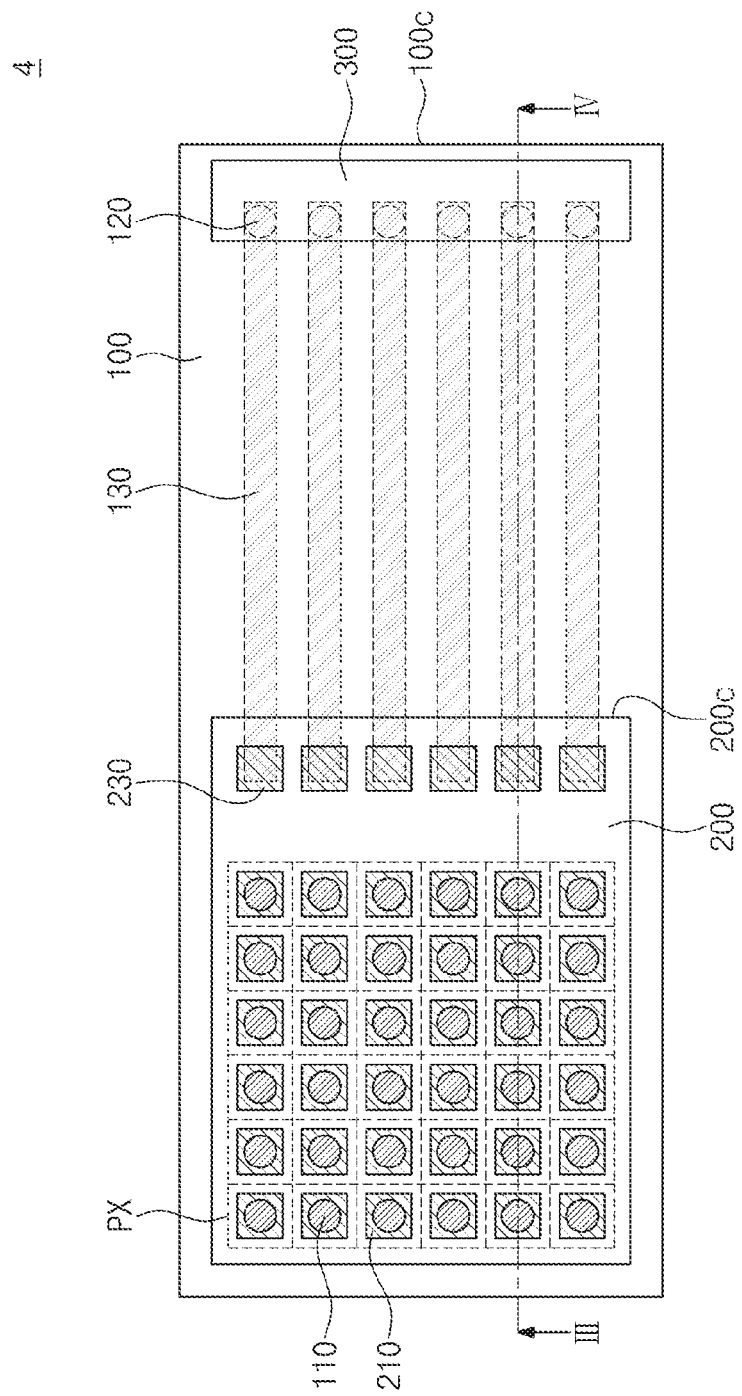
FIG. 8A is a plan view illustrating a sensing module according to an example embodiment.
Figure 8B:
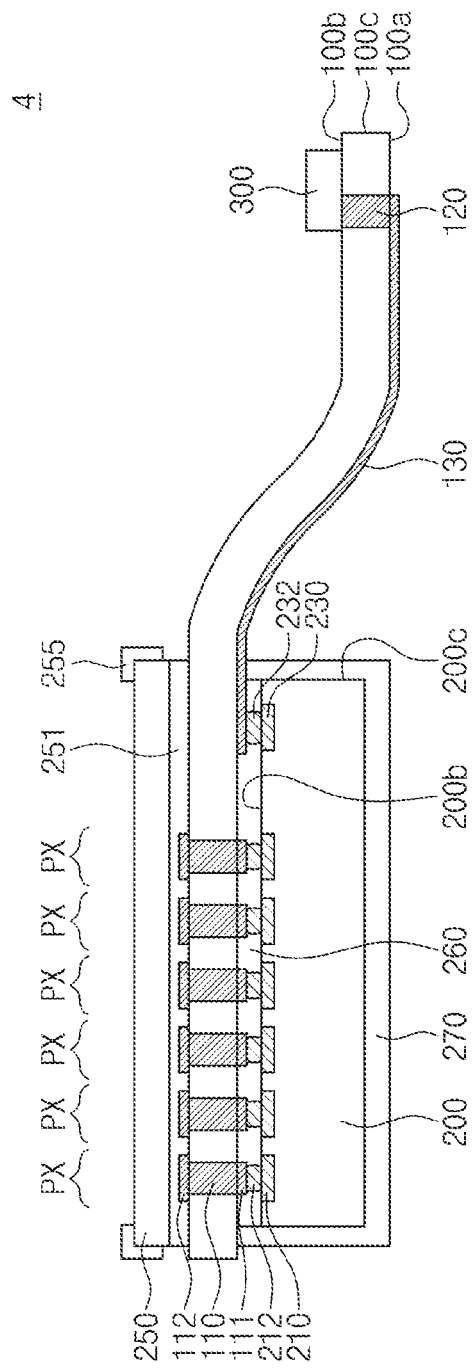
FIG. 8B is a section taken along line III-IV of FIG. 8A.

FIG. 8A is a plan view illustrating a sensing module according to an example embodiment. FIG. 8B is a section taken along line III-IV of FIG. 8A. For concise description, a previously described element may be identified by a similar or identical reference number without repeating an overlapping description thereof.

Referring to FIGS. 8A and 8B, a sensing module 4 may include the film substrate 100, the semiconductor chip 200, the connector 300, the adhesive layer 251, the glass layer 250, the bezel 255, the insulating pattern 260, and the mold layer 270. The film substrate 100 may be configured to have the same features as that described with reference to FIGS. 7A and 7B. The semiconductor chip 200 may be provided on the first surface 100a of the film substrate 100. The sensing plates 210 may be provided vertically in the semiconductor chip 200 and horizontally in the pixels PX. The sensing vias 110 may be provided on the pixels PX, respectively, and may be electrically connected to the sensing plates 210.

The connection pad 230 may be provided on the top surface 200b of the semiconductor chip 200 and may be spaced apart from the sensing plates 210. The connection interposer 232 may be disposed on the connection pad 230. The interconnection pattern 130 may be provided on the first surface 100a of the film substrate 100. An end portion of the interconnection pattern 130 may be coupled to the connection interposer 232. An opposite end portion of the interconnection pattern 130 may be adjacent to the first side 100c of the film substrate 100. The connection via 120 may penetrate the film substrate 100 and may be coupled to the opposite end portion of the interconnection pattern 130.

The connector 300 may be provided on the second surface 100b of the film substrate 100 and may be coupled to the connection via 120. As shown in FIG. 8A, the connector 300 may be overlapped with the connection via 120. A pad or bump may be further provided between the connection via 120 and the connector 300. As shown in FIGS. 4A and 4B, the device 310 may be further provided on the second surface 100b of the film substrate 100. In this case, the interconnection pattern 130 may be further provided between the device 310 and the connector 300.

FIG. 9A is a plan view illustrating a film substrate according to an example embodiment. FIG. 9B is a section taken along line I-II of FIG. 9A. For concise description, a previously described element may be identified by a similar or identical reference number without repeating an overlapping description thereof.

Referring to FIGS. 9A and 9B, the film substrate 100 may further include a conductive via 140 and a conductive pattern 150, in addition to the sensing vias 110, the interconnection pattern 130, and the connection via 120. The sensing vias 110, the lower pads 111, the upper pads 112, the connection via 120, the interconnection pad 121, and the interconnection pattern 130 may be configured to have the same features as those described with reference to FIGS. 5A and 5B.

The conductive via 140 may penetrate the film substrate 100. The conductive via 140 may be laterally spaced apart from the sensing vias 110. The conductive via 140 may be provided between the sensing vias 110 and a second side 100d of the film substrate 100. The first and second surfaces 100a and 100b of the film substrate 100 may be connected to each other by the second side 100d, which may be positioned to be opposite to the first side 100c. Although not illustrated, the second side 100d of the film substrate 100 may connect the first and second surfaces 100a and 100b to each other, but it may be positioned to be adjacent to the first side 100c. The conductive pattern 150 may be provided on the second surface 100b of the film substrate 100. As shown in FIG. 7A, the conductive pattern 150 may be disposed between the sensing vias 110 and the second side 100d of the film substrate 100. The conductive pattern 150 may be coupled to the conductive via 140. The conductive via 140 may be formed of or include the same material as the connection via 120, and the conductive pattern 150 may be formed of or include the same material as the interconnection pattern 130.

Figure 10A:
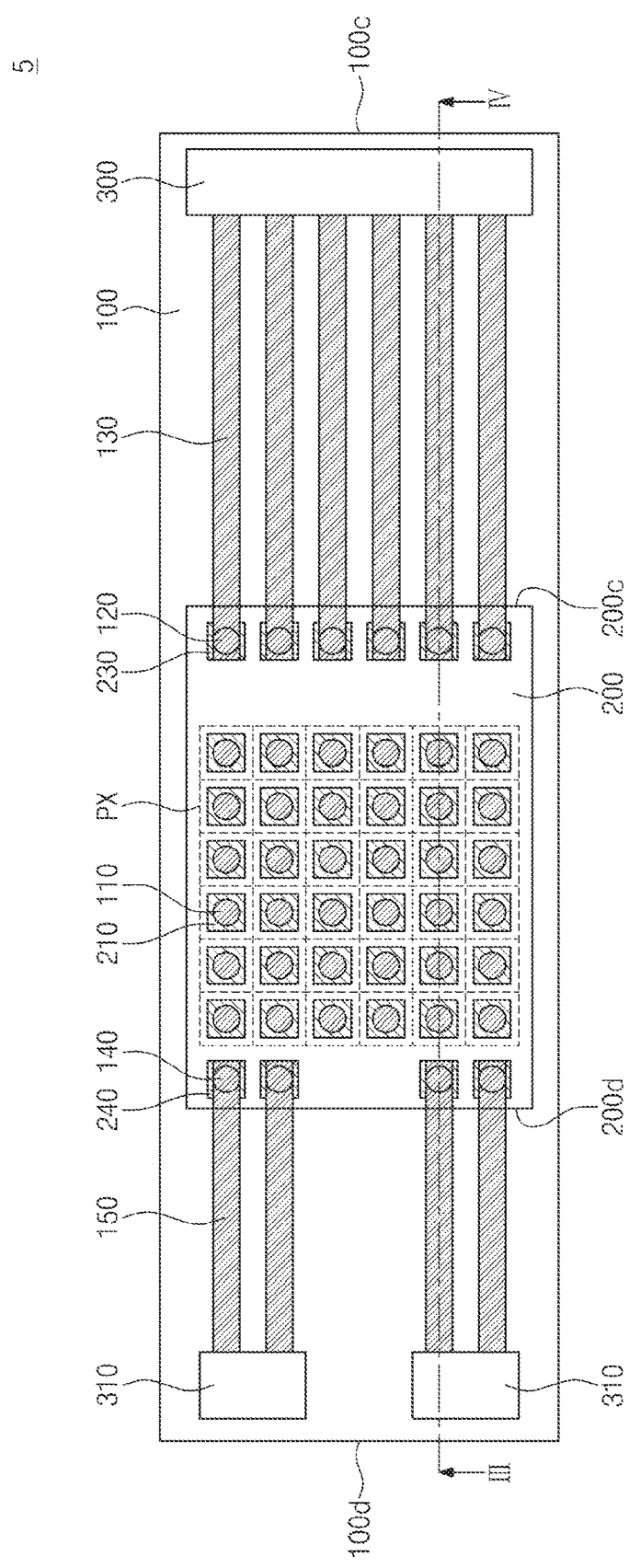
FIG. 10A is a plan view illustrating a sensing module according to an example embodiment.
Figure 10B:
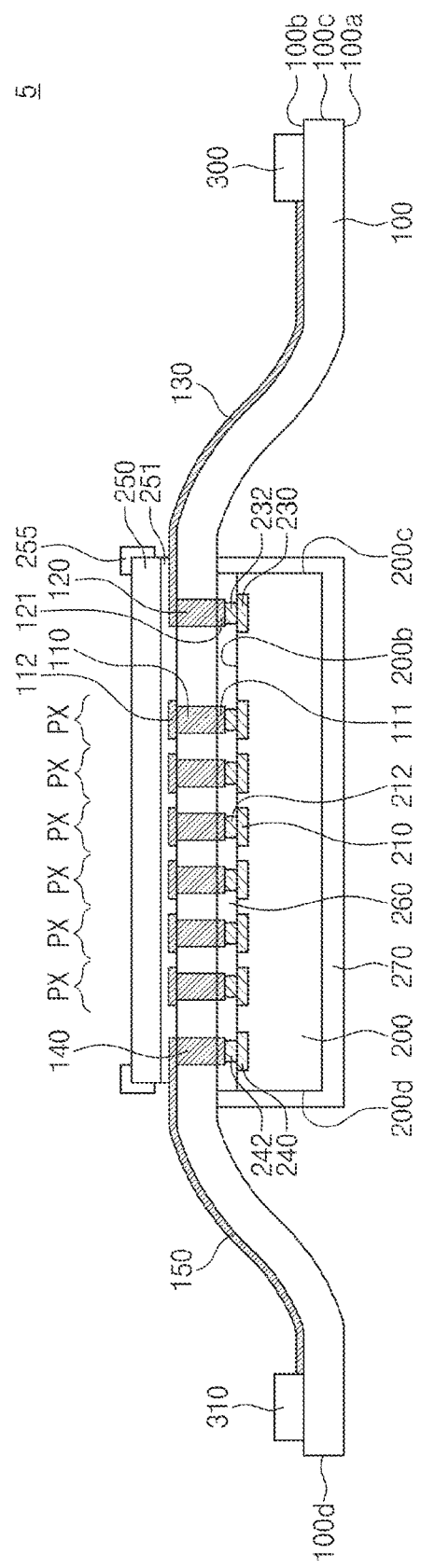
FIG. 10B is a section taken along line III-IV of FIG. 10A.

FIG. 10A is a plan view illustrating a sensing module according to an example embodiment. FIG. 10B is a section taken along line III-IV of FIG. 10A. For concise description, a previously described element may be identified by a similar or identical reference number without repeating an overlapping description thereof.

Referring to FIGS. 10A and 10B, a sensing module 5 may include the film substrate 100, the semiconductor chip 200, the connector 300, the adhesive layer 251, the glass layer 250, the bezel 255, the insulating pattern 260, and the mold layer 270. The semiconductor chip 200 may be provided on the first surface 100a of the film substrate 100. The film substrate 100 may be configured to have the same features as that described with reference to FIGS. 9A and 9B. The sensing vias 110 may be respectively provided on the pixels PX of the semiconductor chip 200 and may be electrically connected to the sensing plates 210. The connection interposer 232 and the connection via 120 may be disposed on each of the connection pads 230. The interconnection pattern 130 may be provided on the second surface 100b of the film substrate 100 and may be coupled to the connection via 120. The disposition and electric connection structure of the connection via 120 and the interconnection pattern 130 may be the same as that described with reference to FIGS. 6A and 6B. The connector 300 may be provided on the second surface 100b of the film substrate 100. The connector 300 may be electrically connected to the interconnection pattern 130.

A conductive pad 240 may be provided on the top surface 200b of the semiconductor chip 200 and may be positioned at a position adjacent to an opposite side 200d of the semiconductor chip 200, compared with the sensing plates 210. The opposite side 200d of the semiconductor chip 200 may be opposite to the side 200c. Although not illustrated, the opposite side 200d of the semiconductor chip 200 may be adjacent to the side 200c. Here, the top surface 200b of the semiconductor chip 200 may connect the side 200c to the opposite side 200d. The conductive pad 240 may be laterally spaced apart from the sensing plates 210 of the semiconductor chip 200 and may be electrically disconnected from the sensing plates 210. The conductive pad 240 may be electrically connected to an integrated circuit of the semiconductor chip 200. The conductive via 140 may be disposed on the conductive pad 240. A conductive interposer 242 may be interposed between the conductive via 140 and the conductive pad 240. The conductive pattern 150 may be provided on the second surface 100b of the film substrate 100 and may be coupled to the conductive via 140. The conductive pattern 150 may be electrically connected to the conductive pad 240 through the conductive via 140 and the conductive interposer 242. In certain embodiments, the conductive interposer 242 may be omitted, and the conductive via 140 may be in contact with the conductive pad 240.

The device 310 may be provided on the second surface 100b of the film substrate 100 and may be adjacent to the second side 100d of the film substrate 100. The device 310 may be coupled to the conductive pattern 150. The disposition of the device 310 is not limited to that illustrated in the drawings and may be variously changed. For example, the device 310 may be disposed on the first surface 100a of the film substrate 100, and in this case, the conductive via 140 may be omitted and the conductive pattern 150 may be provided on the first surface 100a of the film substrate 100.

Figure 11A:
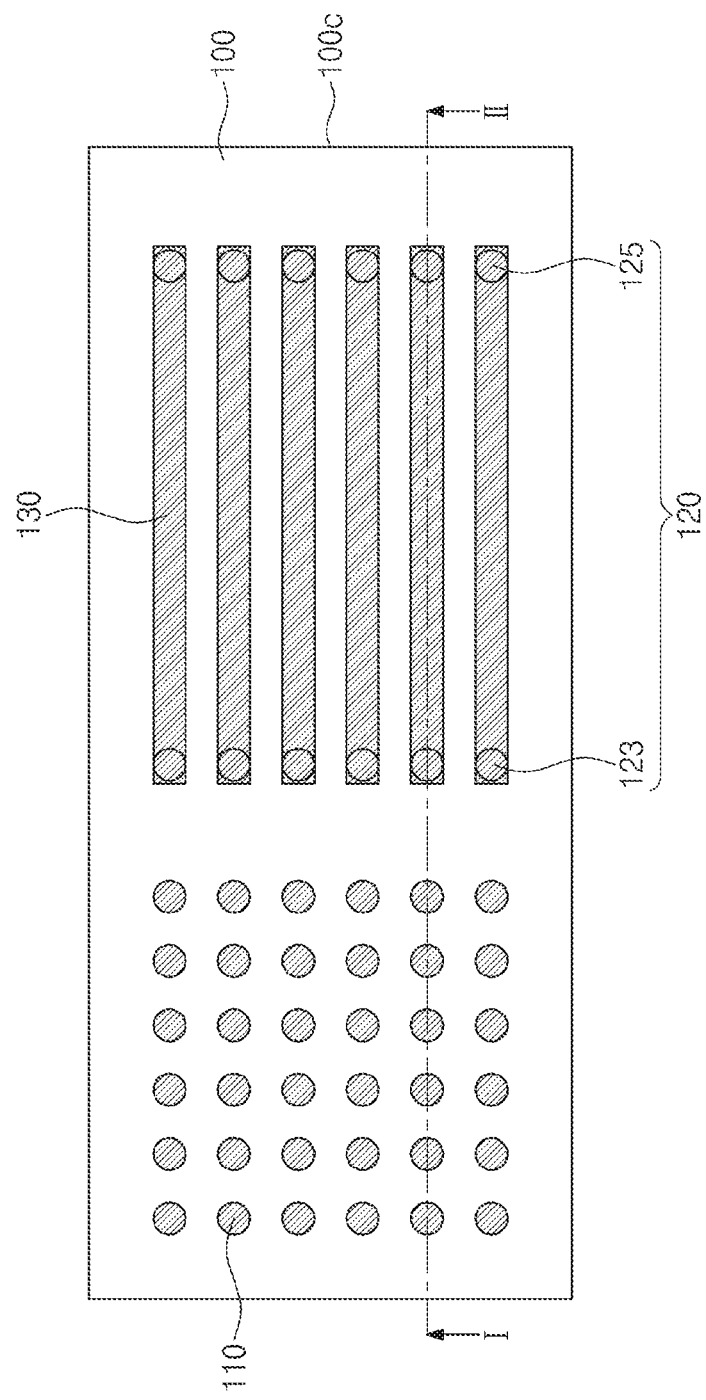
FIG. 11A is a plan view illustrating a film substrate according to an example embodiment.
Figure 11B:
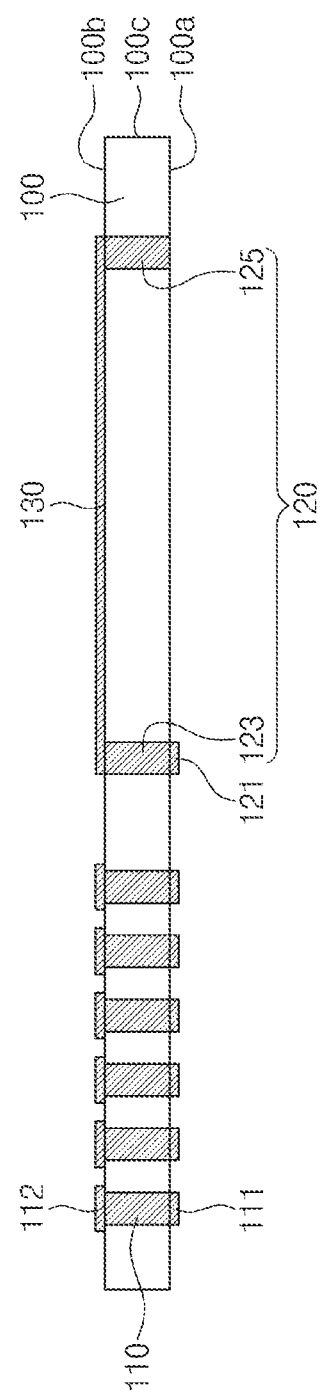
FIG. 11B is a section taken along line I-II of FIG. 11A.

FIG. 11A is a plan view illustrating a film substrate according to an example embodiment. FIG. 11B is a section taken along line I-II of FIG. 11A. For concise description, a previously described element may be identified by a similar or identical reference number without repeating an overlapping description thereof.

Referring to FIGS. 11A and 11B, the film substrate 100 may include the sensing vias 110 and the interconnection pattern 130. The sensing vias 110, the lower pads 111, and the upper pads 112 may be configured to have the same features as those described with reference to FIGS. 3A and 3B.

The connection via 120 may penetrate the film substrate 100. The connection via 120 may be disposed between the sensing vias 110 and the first side 100c of the film substrate 100. The connection via 120 may include a first connection via 123 and a second connection via 125. The second connection via 125 may be provided at a position adjacent to the first side 100c of the film substrate 100, compared with the first connection via 123. The interconnection pattern 130 may be provided on the second surface 100b of the film substrate 100. An end portion of the interconnection pattern 130 may be coupled to the first connection via 123. An opposite end portion of the interconnection pattern 130 may be coupled to the second connection via 125. The interconnection pad 121 may be disposed on the first surface 100a of the film substrate 100. The interconnection pad 121 may be provided on a bottom surface of the connection via 120 and may be coupled to the connection via 120. The interconnection pad 121 may be formed of or include at least one of copper (Cu), aluminum (Al), tin (Sn), gold (Au), or alloys thereof. In certain embodiments, the interconnection pad 121 may be omitted.

Figure 12A:
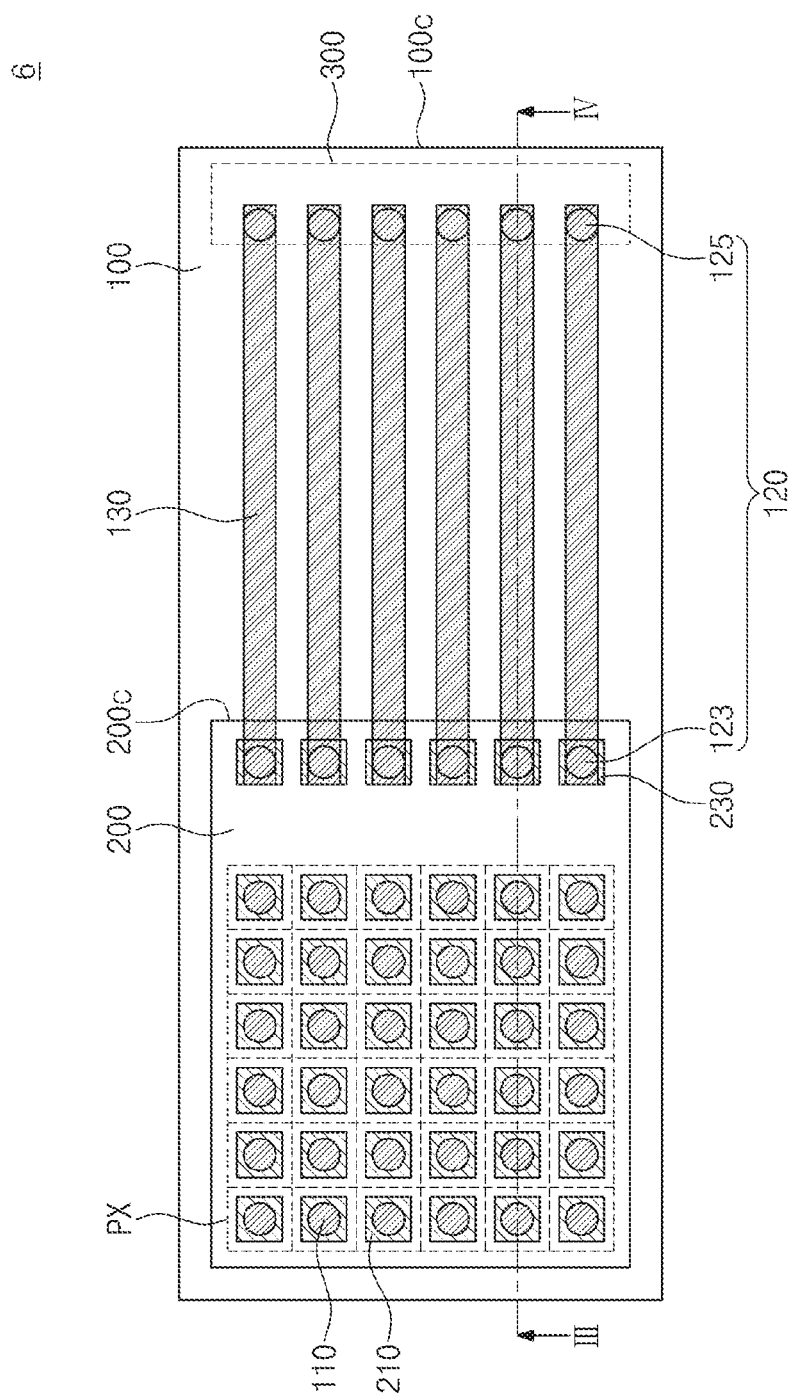
FIG. 12A is a plan view illustrating a sensing module according to an example embodiment.
Figure 12B:
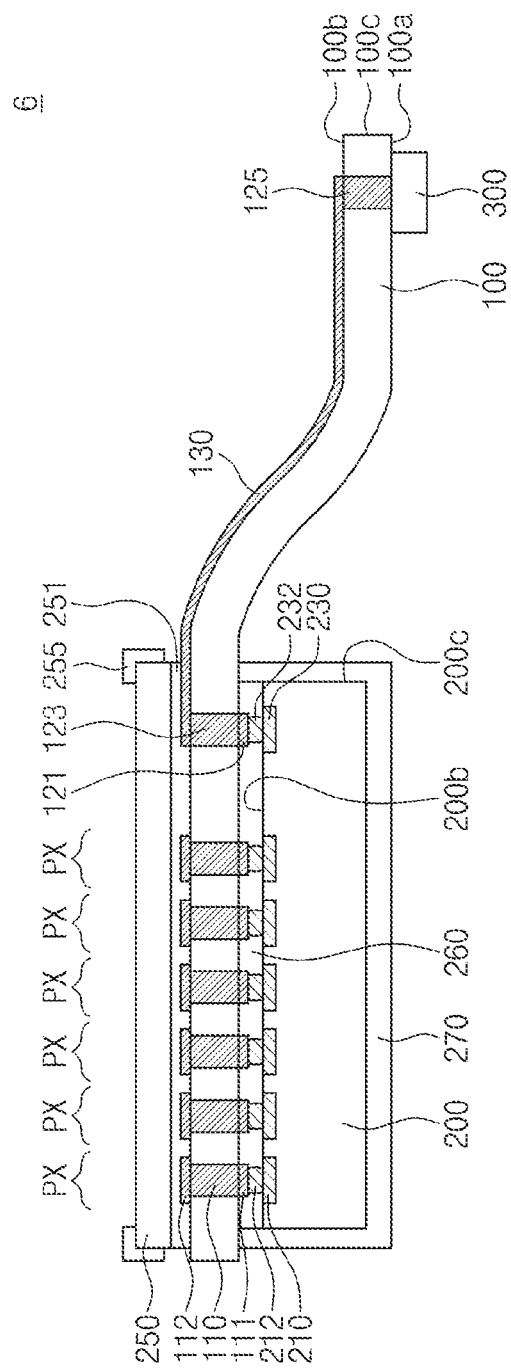
FIG. 12B is a section taken along line III-IV of FIG. 12A.

FIG. 12A is a plan view illustrating a sensing module according to an example embodiment. FIG. 12B is a section taken along line III-IV of FIG. 12A. For concise description, a previously described element may be identified by a similar or identical reference number without repeating an overlapping description thereof.

Referring to FIGS. 12A and 12B, a sensing module 6 may include the film substrate 100, the semiconductor chip 200, the connector 300, the adhesive layer 251, the glass layer 250, the bezel 255, the insulating pattern 260, and the mold layer 270. The semiconductor chip 200 may be provided on the first surface 100a of the film substrate 100. The film substrate 100 may be configured to have the same features as that described with reference to FIGS. 11A and 11B. The sensing plates 210 may be provided on the pixels PX, respectively, of the semiconductor chip 200. The sensing vias 110 may be respectively provided on the pixels PX of the semiconductor chip 200 and may be electrically connected to the sensing plates 210.

The connection pad 230 may be provided on the top surface 200b of the semiconductor chip 200 and may be laterally spaced apart from the sensing plates 210. When viewed in a plan view, as shown in FIG. 12A, the first connection via 123 may be overlapped with the connection pad 230. As shown in FIG. 12B, the connection interposer 232 and the interconnection pad 121 may be interposed between the connection pad 230 and the first connection via 123. The first connection via 123 may be electrically connected to the connection pad 230 through the interconnection pad 121 and the connection interposer 232. In certain embodiments, the connection interposer 232 or the interconnection pad 121 may be omitted.

The interconnection pattern 130 may be provided on the second surface 100b of the film substrate 100. An end portion of the interconnection pattern 130 may be coupled to the connection via 120. An opposite end portion of the interconnection pattern 130 may be coupled to the second connection via 125.

The connector 300 may be provided on the first surface 100a of the film substrate 100. The second connection via 125 may be coupled to the connector 300. The device 310 of FIGS. 4A and 4B may be further provided on the first surface 100a of the film substrate 100. In this case, the second connection via 125 may be further provided between the interconnection pattern 130 and the device 310. As another example, the device 310 of FIGS. 4A and 4B may be provided on the second surface 100b of the film substrate 100, and the interconnection pattern 130 may be connected to the device 310. The number and disposition of the connection via 120 and the disposition of the interconnection pattern 130 are not limited to that illustrated in the drawings and may be variously changed.

According to some example embodiments, sensing vias may be provided on a sensing plate. The sensing vias may be configured to transfer information on a user's touch event to sensing plates of a semiconductor chip. The use of the sensing vias may make it possible to improve sensitivity and accuracy in a sensing operation of the semiconductor chip. The semiconductor chip may be electrically connected to a connector through an interconnection pattern, and thus, it is unnecessary to provide bonding wires. The connector and the semiconductor chip may be disposed on a film substrate, and thus, it is unnecessary to provide other package substrate such as PCB. Accordingly, it is possible to reduce a size of the sensing module.

While example embodiments have been particularly shown and described, it will be understood by one of ordinary skill in the art that variations in form and detail may be made therein without departing from the spirit and scope of the attached claims.

What is claimed is:

1. A sensing module substrate comprising:
   a film substrate having a first surface and a second surface;
   sensing vias which extend completely through the film substrate and penetrate the first surface and the second surface, each of the sensing vias being configured to be coupled to pixels of a semiconductor chip; and
   an interconnection pattern provided on at least one of the first surface and the second surface of the film substrate.

2. The sensing module substrate of claim 1, wherein the sensing vias are arranged in an array in the film substrate.

3. The sensing module substrate of claim 1, wherein the interconnection pattern comprises at least two interconnection elements extending in a longitudinal direction of the film substrate and arranged in parallel.

4. The sensing module substrate of claim 1, wherein the interconnection pattern is spaced apart from the sensing vias and electrically disconnected from the sensing vias.

5. The sensing module substrate of claim 1, wherein the interconnection pattern comprises at least one conductive material.

6. The sensing module substrate of claim 1, wherein the sensing vias comprise at least one conductive material, and the film substrate comprises a polymeric material.

7. The sensing module substrate of claim 1, wherein the interconnection pattern comprises a first interconnection pattern which is provided on and extends in a longitudinal direction of the first surface of the film substrate, and a second interconnection pattern which is provided on and extends in the longitudinal direction of the second surface of the film substrate, and
wherein the sensing module substrate further comprises a connection via which penetrates the film substrate from the first surface to the second surface, and electrically connects the first interconnection pattern and the second interconnection pattern.

8. A sensing module comprising:
a film substrate having a first surface and a second surface;
sensing vias which extend completely through the film substrate and penetrate the first surface and the second surface; and
a semiconductor chip provided at the first surface of the film substrate and coupled to the sensing vias, the semiconductor chip comprising pixels provided at a surface of the semiconductor chip at positions corresponding to the sensing vias.

9. The sensing module of claim 8, wherein the sensing vias are arranged in an array in the film substrate.

10. The sensing module of claim 8, wherein the semiconductor chip is disposed directly beneath the sensing vias.

11. The sensing module of claim 8, wherein the sensing vias are configured to transmit, to the semiconductor chip, information to measure an electric capacitance corresponding to a touch event occurring at the sensing vias on the second surface of the film substrate.

12. The sensing module of claim 8, further comprising;
an interconnection pattern provided on at least one of the first surface and the second surface of the film substrate; and
a connector provided on one of the first surface and the second surface of the film substrate,
wherein the semiconductor chip and the connector are electrically connected through the interconnection pattern.

13. The sensing module of claim 12, wherein the interconnection pattern and the connector are disposed on the first surface of the film substrate.

14. The sensing module of claim 12, the interconnection pattern comprises a first interconnection pattern which is provided on and extends in a longitudinal direction of the first surface of the film substrate, and a second interconnection pattern which is provided on and extends in the longitudinal direction of the second surface of the film substrate, and
wherein the sensing module further comprises a connection via which penetrates the film substrate from the first surface to the second surface, and electrically connects the first interconnection pattern and the second interconnection pattern.

15. The sensing module of claim 8, further comprising sensing plates provided at the surface of the semiconductor chip and at positions corresponding the pixels, wherein the sensing vias are electrically connected to the sensing plates.

16. A sensing module comprising:
a film substrate having a first surface and a second surface;
sensing vias which extend completely through the film substrate and penetrate the first surface and the second surface;
a semiconductor chip provided at the first surface of the film substrate and coupled to the sensing vias, the semiconductor chip comprising pixels provided at a surface of the semiconductor chip at positions corresponding to the sensing vias;
a glass layer provided on the second surface of the film substrate and over the sensing vias; and
a bezel partially covering at least one of a top surface and a side surface of the glass layer.

17. The sensing module of claim 16, wherein the sensing vias are arranged in an array in the film substrate, and the semiconductor chip is disposed directly beneath the sensing vias.

18. The sensing module of claim 16, further comprising:
a first interconnection pattern which is provided on and extends in a longitudinal direction of the first surface of the film substrate;
a second interconnection pattern which is provided on and extends in the longitudinal direction of the second surface of the film substrate; and
a connection via which penetrates the film substrate from the first surface to the second surface, and electrically connects the first interconnection pattern and the second interconnection pattern.

19. The sensing module of claim 16, wherein the sensing vias are configured to transmit, to the semiconductor chip, information to measure an electric capacitance corresponding to a touch event occurring at the sensing vias on the second surface of the film substrate.

20. The sensing module of claim 16, further comprising;
an interconnection pattern provided on at least one of the first surface and the second surface of the film substrate; and
a connector provided on one of the first surface and the second surface of the film substrate,
wherein the semiconductor chip and the connector are electrically connected through the interconnection pattern.

* * * * *